US007146698B2

(12) United States Patent
Kovar

(10) Patent No.: US 7,146,698 B2
(45) Date of Patent: Dec. 12, 2006

(54) HAND-HELD RIVETING TOOL

(75) Inventor: Martin Kovar, Nachod (CZ)

(73) Assignee: Masterfix Products B.V., Airport (NL)

( * ) Notice: Subject to any disclaimer, the term of this patent is extended or adjusted under 35 U.S.C. 154(b) by 0 days.

(21) Appl. No.: 11/118,997

(22) Filed: Apr. 29, 2005

(65) Prior Publication Data

US 2005/0189145 A1 Sep. 1, 2005

Related U.S. Application Data

(63) Continuation of application No. 10/367,779, filed on Feb. 19, 2003, now Pat. No. 6,912,763.

(30) Foreign Application Priority Data

Feb. 18, 2002 (CZ) ................................ 200212840

(51) Int. Cl.
*B21J 15/04* (2006.01)
*B21L 15/04* (2006.01)
*B23P 11/00* (2006.01)

(52) U.S. Cl. ................................ 29/243.527; 72/391.4

(58) Field of Classification Search ........... 29/243.521, 29/243.526, 243.527; 72/114, 391.4, 391.8
See application file for complete search history.

(56) References Cited

U.S. PATENT DOCUMENTS

| | | | |
|---|---|---|---|
| 2,384,037 A | 9/1945 | Kugler | |
| 3,406,557 A | 10/1968 | Harris | |
| 4,648,259 A | 3/1987 | Pendleton | |
| 4,878,372 A | 11/1989 | Port et al. | |
| 4,896,522 A | 1/1990 | Rosier | |
| 5,079,818 A | 1/1992 | Schwab | |
| 5,323,521 A | 6/1994 | Freund et al. | |
| 5,357,666 A | 10/1994 | El Dessouky et al. | |
| 5,359,762 A | 11/1994 | Liu | |
| 5,452,505 A | 9/1995 | Gasser | |
| 5,771,738 A | 6/1998 | Ko | |
| 6,182,345 B1 | 2/2001 | Travis | |
| 6,449,822 B1 | 9/2002 | Gilbert et al. | |
| 6,912,763 B1 * | 7/2005 | Kovar | 29/243.527 |

FOREIGN PATENT DOCUMENTS

| | | |
|---|---|---|
| DE | 39 17 507 A1 | 2/1991 |
| FR | 2 660 886 A1 | 10/1991 |

* cited by examiner

*Primary Examiner*—David Jones
(74) *Attorney, Agent, or Firm*—Harness, Dickey & Pierce, P.L.C.

(57) ABSTRACT

A hand-held riveting tool includes a body, a tube passing through the body, a drive shaft passing through the inside of the tube, a clamping connection between an interchangeable mandrel and the drive shaft, and a hand operated pressure mechanism. The pressure mechanism comprises a pressure mandrel slidingly positioned on the tube. The pressure mandrel has an outer shoulder into which the shaped ends of two controlling levers are fitted, which levers are fastened on pins positioned in the body and have handles. A front nozzle having an interchangeable extension is supported on an extension of the pressure mandrel, the outwardly protruding interchangeable mandrel freely passing through the interchangeable extension.

15 Claims, 4 Drawing Sheets

HAND-HELD RIVETING TOOL

CROSS-REFERENCE TO RELATED APPLICATIONS

This application is a continuation of U.S. patent application Ser. No. 10/367,779, filed Feb. 19, 2003, now U.S. Pat. 6,912,763, claiming priority under 35 U.S.C. §119 to Czech Republic Application No. 2002-12840, filed Feb. 18, 2002, and commonly owned.

FIELD OF THE INVENTION

The invention involves a clamping connection for an interchangeable mandrel and drive shaft of a riveting tool and use of that clamping connection for hand-held riveting tools.

DESCRIPTION OF THE PRIOR ART

The mandrels for nut and screw rivets are generally securely tightened with a key to the front stop of riveting tools, either to the lock nut or to the shoulder on the traction mandrel of the riveting tool. Tightening is necessary so that spontaneous loosening from the traction mandrel does not occur. This tightening operation requires a certain amount of time and equipment (keys) all of which lengthens the time taken in changing mandrels.

This situation is definitely improved by the arrangement whereby the traction mandrel is furnished with a traction casing freely positioned in a changeable casing, these casings being mutually secured against rotating. Between it and the peripheral shoulder of the traction casing there is a pressure spring. The traction casing is furnished with an inner thread to which a pin is screwed, the collar of which is furnished on its outer perimeter with at least one beveled surface, which is complementary in shape to the inner peripheral surface of the adjacent part of the changeable casing. The equipment is positioned together with the traction mandrel in the nozzle of the riveting tool, which has a through opening in the area of the changeable casing. The pressure spring is positioned against a lock-nut, screwed on to the traction mandrel. The securing of the axial thrust of the changeable casing with respect to the traction casing is accomplished by means of a securing ring, fixed in a recess of the changeable casing and resting against the stepped end of the traction casing.

The advantage of this solution is that if it is not necessary to use a tightening tool (key), it is possible to change the mandrels for nut and screw rivets on riveting tools easily and very quickly. The construction is however fairly complicated and increases production expenses for the riveting tool.

SUMMARY OF THE INVENTION

The disadvantages of the present situation are to a considerable degree removed by the new arrangement of the clamping connection for an interchangeable mandrel and drive shaft of a riveting tool and use of that clamping connection for hand-held riveting tools. The clamping connection for an interchangeable mandrel and drive shaft of a riveting tool comprises a connecting casing to which the end of the drive shaft is fastened on one side, while on the other side there is an open cavity in the casing, adapted for inserting the end of the interchangeable mandrel, in a transverse direction, until its expanded end part is inside the cavity and its axis lies along the axis of the drive shaft and the casing. The interchangeable mandrel in this position is moveable in the direction of the common axis by the action of a pressure element across engaging, rolling surfaces arranged on the front surface of the expanded end part of the interchangeable mandrel and on the adjacent surface of the pressure element, to the clamped position where the interchangeable mandrel is gripped by its expanded end part in the cavity of the casing by means of a correspondingly shaped surface, arranged in the cavity of the connecting casing, with the possibility of axial movement and secured against rotation.

The advantage of this solution is basically the speed and ease with which the mandrel is changed for one of another size. For transfer of the drive force there is no threaded connection between the mandrel and the casing which slows down the change. All of this makes possible an increase in productivity during riveting and reduces preparation time.

The cavity of the casing is a through cavity and has a cylindrical part furnished with a thread for screwing on the drive shaft, which cylindrical part is stepped down on the inside to a smaller diameter. A stopping surface is thus created for the contacting pressure element. The cylindrical part of the cavity joins the part with the rectangular section for guiding the interchangeable mandrel, which also has a rectangular section in its corresponding part. The passage between these two parts of the cavity is arranged as a stop for the correspondingly shaped contact surface of the expanded end part of the interchangeable mandrel. The casing at the same time is furnished with a radial slot reaching into its cavity, which runs the length of the casing and in part of the cavity with the rectangular section has basically the same rectangular section and then expands so that its width is greater by its clearance than the section of the expanded end part of the interchangeable mandrel. The length of the part of the interchangeable mandrel with rectangular section is greater than the distance of the free end of the casing from the expansion of its radial slot.

This arrangement facilitates and speeds up the insertion of the interchangeable mandrel into the cavity of the connecting casing and also its withdrawal.

The pressure element, in one of its possible embodiments, can comprise a pressure spring, located in the axial recess of the drive shaft together with a pressure pin, the end of which, reaching into the cavity of the casing, has an expansion in the shape of a head with front rolling surface, where the head in its withdrawn end position reaches the seat formed by the shaped shoulder in the cavity of the casing. The head of the pressure pin can be spherical.

In another embodiment of this invention the pressure element can comprise a pressure spring, located in the cavity of the casing and fitting tightly against a ball, freely positioned in this cavity of the casing, which in its withdrawn end position reaches the seat formed by the shaped shoulder in the cavity of the casing, the diameter of the ball being greater than the width of the transverse radial slot of the casing.

The interchangeable mandrel can be formed with a pin at one end furnished with a thread for connecting with the rivet and at the other end with a terminal clamping head, which on the side adjacent to the shaft of the pin has an engaging surface, basically vertical to the axis of the pin, and on the other side a spherical rolling surface, while for part of its length the pin is furnished with a bilateral shoulder running symmetrically in the direction of the axis, so that in this part it has a basically rectangular section, corresponding to the rectangular section of part of the cavity of the casing in which, in the clamped position during operation of the riveting tool, it is slidingly but not rotatingly guided.

The subject of the invention is also the use of the said clamping connection for hand-held riveting tools, where the casing with interchangeable mandrel is placed in the front nozzle, to which is fixed an interchangeable extension with staying front surface for riveting, and together with the nozzle is tightly inserted in the extension of the sliding pressure mandrel, which is arranged for engagement with the controlling levers of the tool.

BRIEF DESCRIPTION OF THE DRAWINGS

For a clearer explanation, an example of an embodiment of this technical solution is illustrated in the attached drawings and is described in detail in the text that follows:

FIG. 2' is a view of FIG. 2 with the casing 15 shown in cross-section.

DETAILED DESCRIPTION

Figure 1:
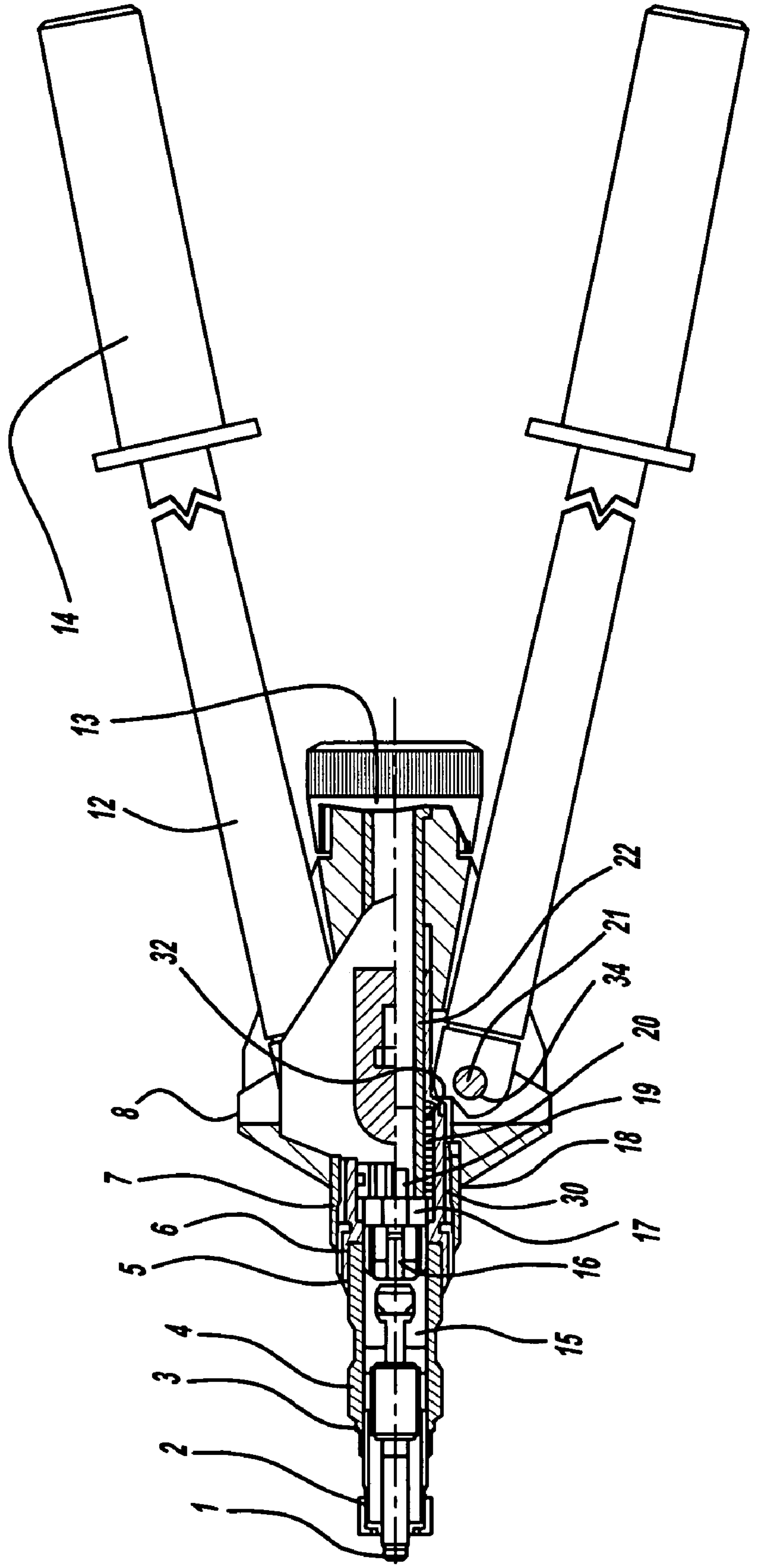
In FIG. 1 is a schematic illustration in partial section of the arrangement of a hand-held riveting tool for nut and screw rivets with clamping connection for an interchangeable mandrel and drive shaft of a riveting tool.
Figure 2:
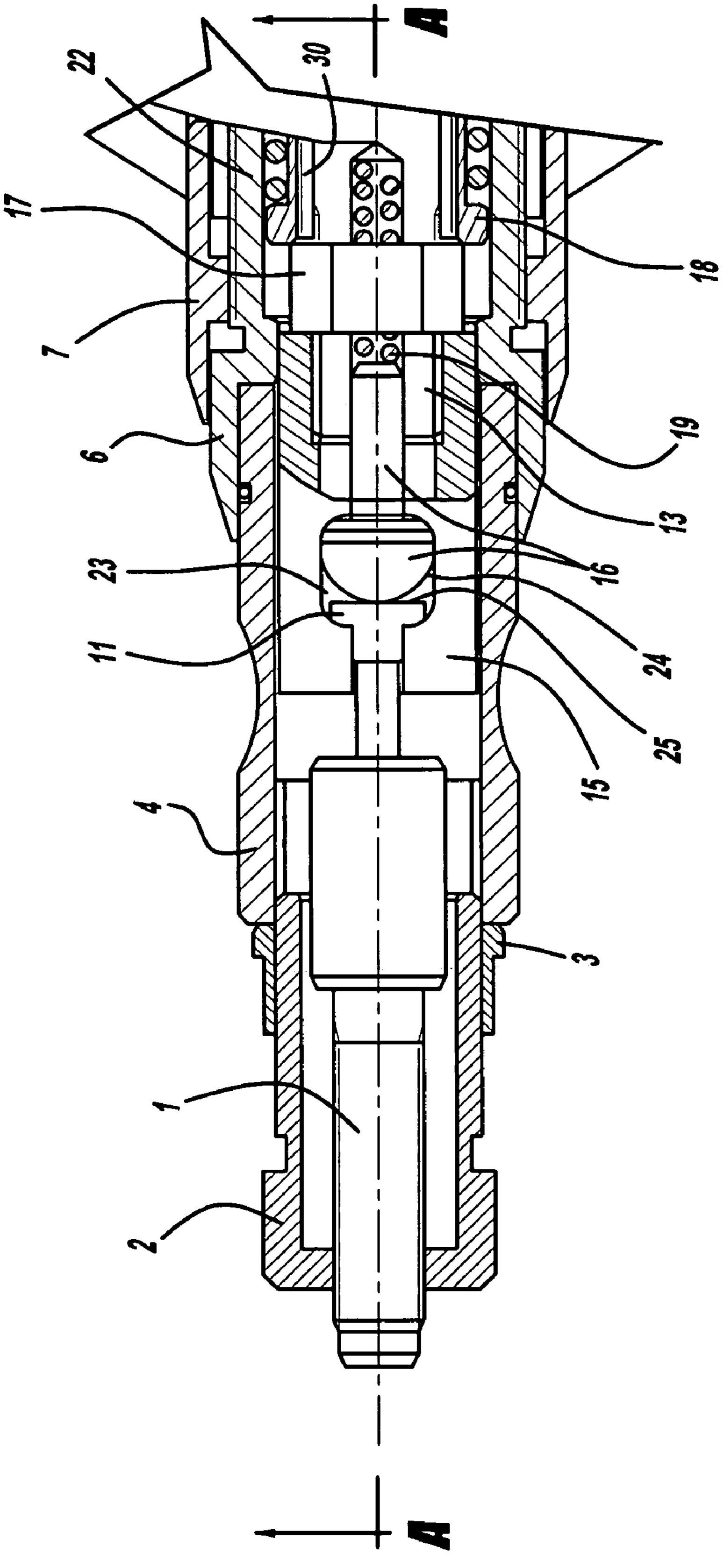
FIG. 2 is a larger scale detailed view of the clamping connection.
Figure 2:
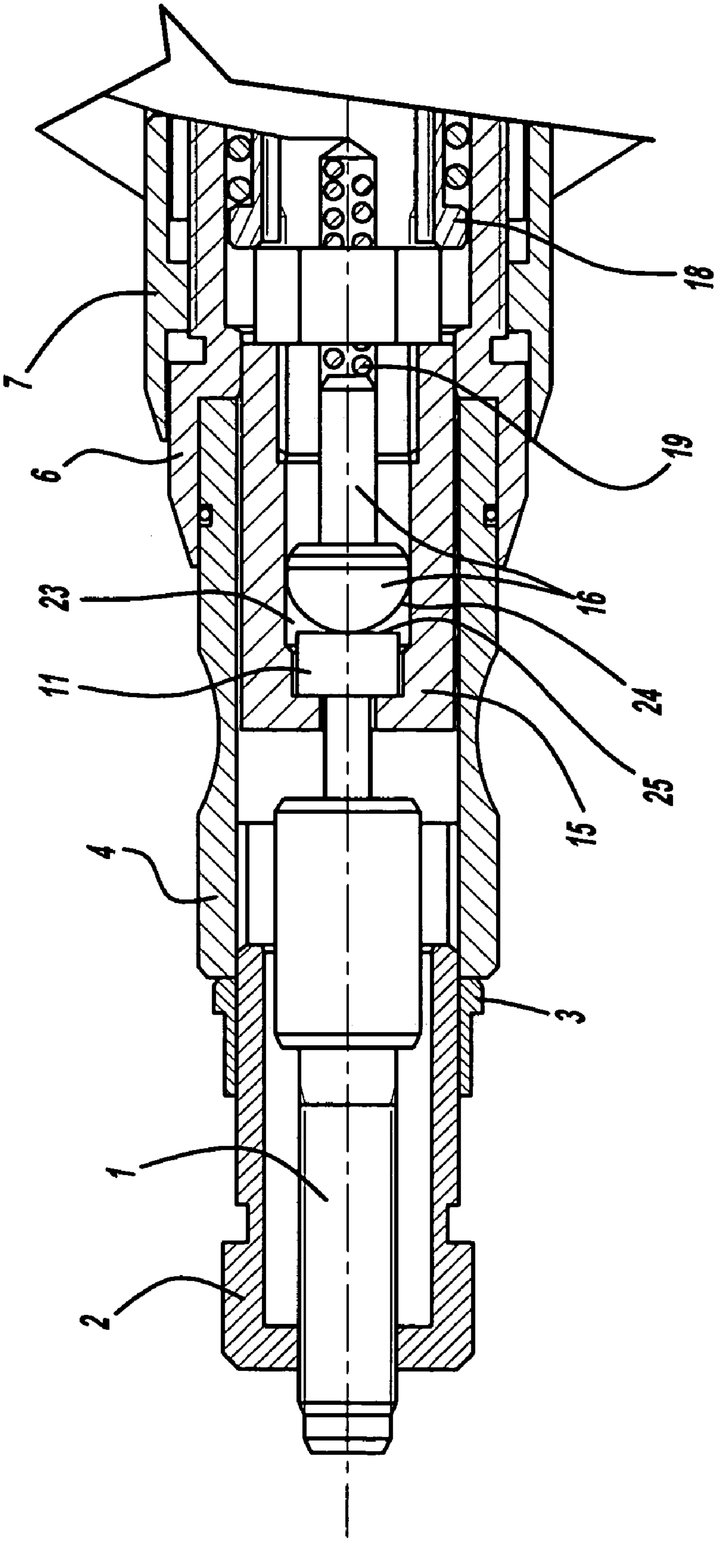
Figure 3:
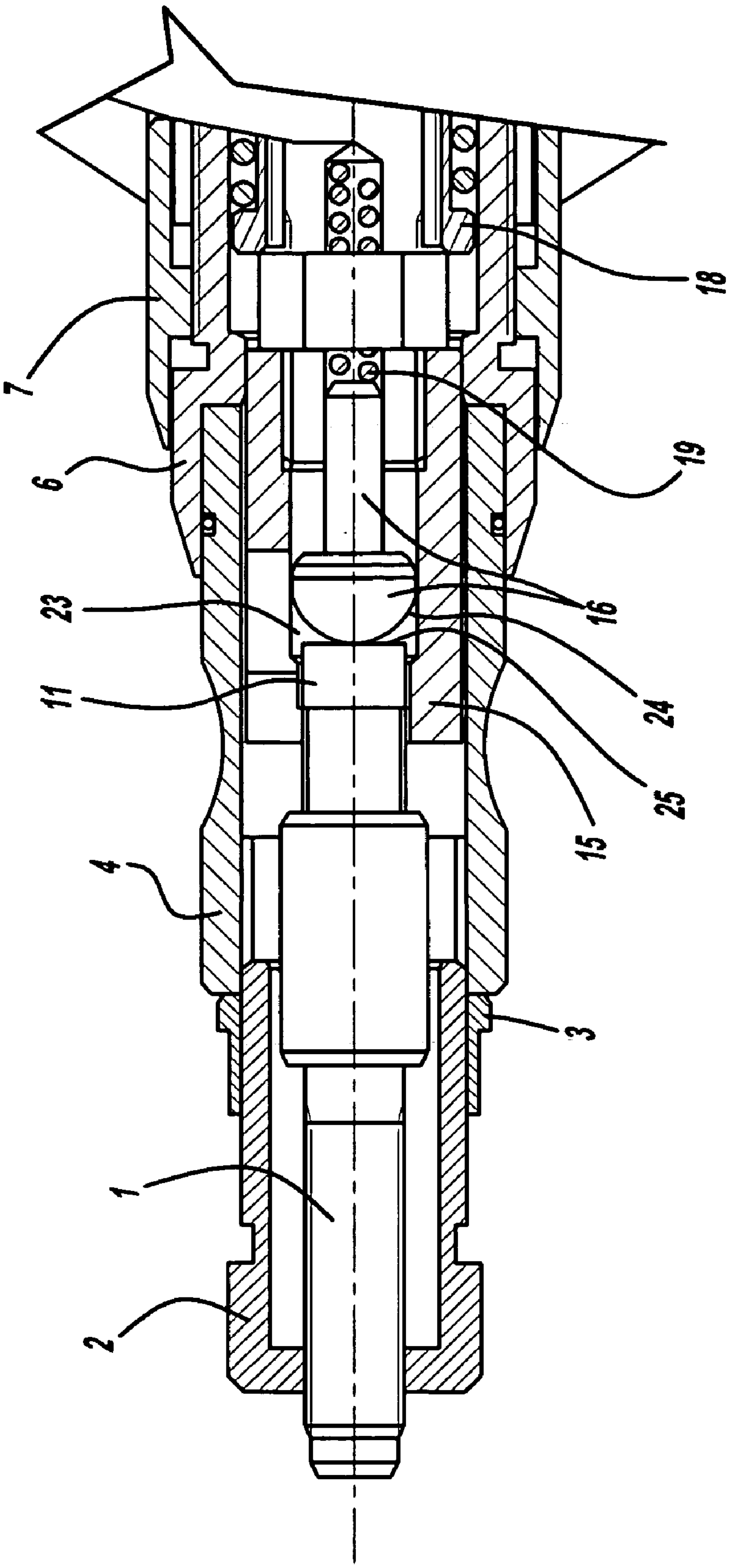
FIG. 3 is a view along the line A—A of FIG. 2.

A tube 30 passes through the plastic body 8 of the hand-held riveting tool (it can be pressed in or freely inserted), the tube 30 having a thread at its outer end, onto which a nut 18 is screwed. A drive shaft 13 passes through the inside of the tube 30 having on its back end a screwed-on nut causing the rotating movement of the drive shaft for the purpose of screwing or unscrewing the nut or screw rivet to/from the interchangeable mandrel 1 in the front part of the tool (the interchangeable mandrel 1 is intended for screwing or unscrewing nut or screw rivets of various sizes). The purpose of the drive shaft 13 is to transfer the drive force from the rivet (during riveting) and also, as already mentioned, to turn the interchangeable mandrel 1. In the front part there can be an axial opening in the drive shaft 13 for positioning the pressure spring 19. The shaft of the pressure pin 16 goes into this axial opening (approx. 30 mm in length) and fits tightly with one of its ends against the pressure spring 19, the opposite outer end being rounded or slanted (instead of this pin 16 there can be a ball).

A lock nut 17 is screwed to the drive shaft 13 passing through the body 8 of the tool, and fits closely against the connecting casing 15. This casing 15 has on its front surface a shaped, basically rectangular slot which passes into the cavity 23 of the casing 15 in which the pressure pin 16 (or ball), with rounded or slanted end 24, is situated. This end is adjacent to the inner shoulder of the cavity 23 of the casing 15, to which the pressure pin 16 is pressed by the pressure spring 19.

The shaped slot with the cavity 23 of the casing 15 is adapted for the free insertion of the interchangeable mandrel 1. The cylindrical cavity of the connecting casing 15, which at one end is furnished with an inner thread for screwing on the drive shaft 13, at the opposite end first of all contracts and thus forms a rounded surface for coming into contact with the expanded end part of the pressure pin 16, which corresponds in shape, and then passes into the part of the cavity basically rectangular in section, corresponding to the section of the shoulder of the interchangeable mandrel 1. At this end of the connecting casing 15 its cavity in the transverse direction is opened by the slot which runs through the wall of the casing 15 for the whole length of the stepped part of the rectangular-section cavity, and then the slot expands into an oval shape, lengthwise in the direction of the axis, whose width corresponds to the size of the radius of the expanded end part 11 of the interchangeable mandrel 1 (its clamping head). The head of the pressure element (the radius of the ball in the case of an expanded head of the pressure pin 16 with front rolling surface 24) is greater than the width of the oval-shaped slot of the casing 15. The interchangeable mandrel 1 is formed of a pin at one end furnished with a thread for connecting to the rivet, and at the other end a terminal clamping head, which on the side adjacent to the shaft of the pin has a contact surface 25, basically vertical to the axis of the pin, and on the other side a spherical rolling surface. On part of its length the pin has a bilateral shoulder running symmetrically in the direction of the axis, so that in this part it has a basically rectangular section, corresponding to the rectangular section of the part of the cavity 23 in the casing 15 in which, in the clamped position during the operation of the riveting tool, it is slidingly but not rotatingly guided. After insertion into the casing 15, the interchangeable mandrel 1 cannot rotate with respect to the casing 15.

The pressure mandrel 22 is slidingly positioned on the tube 30 passing through the plastic body 8 of the hand-held riveting tool. An outer shoulder 32 is formed on the pressure mandrel 22, into which are fitted the shaped ends 34 of the two levers 12 of the riveting tool, which have handles 14 and are fastened on pins 21 positioned in the plastic body 8. An extension 6 of this pressure mandrel 22 (the extension 6 can also be an integral part of the pressure mandrel 22)is screwed into the outer end of the pressure mandrel 22. A front nozzle 4 is freely put onto (inserted into) the extension 6 through a securing O-ring 5, which is situated in its outer recess. Screwed to the front nozzle 4 is an interchangeable extension 2 with lock-nut 3 through which the outwardly protruding interchangeable mandrel 1 freely passes. A nut 7 for regulating the stroke of the pressure mechanism is screwed to the extension 6, the back part of this nut 7 forming an adjustable stop for the pressure mechanism with respect to the plastic body 8 of the hand-hand riveting tool and a setting for the stroke of the pressure mechanism. In the space between the nut 18 screwed to the tube in the body 8 of the tool and the pressure mandrel 22, there is a reversible spring 20 which serves to return the pressure mechanism to the original position.

On breakdown of the interchangeable mandrel 1 (wear and tear occurs during riveting), the front nozzle 4 is pulled out of the extension 6, the interchangeable mandrel 1 comes out of the casing 15 (after pressing the mandrel 1 on the front of the casing 15) and after changing, the front nozzle 4 is again placed in the extension 6. In changing the mandrel 1 for another size, the front nozzle 4 is pulled out in the same way from the extension 6 and the mandrel 1 is changed for another one. The interchangeable extension 2, together with the lock-nut 3, is unscrewed from the front nozzle 4, it is exchanged for another interchangeable extension 2 with lock-nut 3 and the whole is inserted once more.

The advantage of this solution is basically the speed and ease with which the mandrel 1 is exchanged for another size. For transfer of the drive force there is no threaded connection between the mandrel 1 and the casing 15 which slows down the change. All of this makes possible an increase in productivity during riveting and reduces preparation time.

The invention has been described with reference to an illustrative embodiment solely for the sake of example. The scope and spirit of the invention is found in the appropriately interpreted claims.

What is claimed is:

1. A hand-held riveting toot comprising: a body, a tube passing through the body, a drive shaft passing through an inside of the tube, an interchangeable mandrel, a clamping connection between the interchangeable mandrel and the drive shaft, and a hand operated pressure mechanism, wherein the pressure mechanism comprises a pressure mandrel slidingly positioned on an outside of the tube and having an extension, the pressure mandrel having an outer shoulder, two controlling levers each having shaped ends fitted into the outer shoulder, which levers are rotatably coupled to the body such that rotational movement of the controlling levers causes their shaped ends to bear against the outer shoulder of the pressure mandrel causing translational movement thereof, and a front nozzle having an interchangeable extension supported on the extension of the pressure mandrel, the interchangeable mandrel freely passing through the interchangeable extension to outwardly protrude therefrom.

2. The riveting tool according to claim 1 wherein the front nozzle has an outer recess and is freely positioned on the extension of the pressure mandrel and is secured thereon by an O-ring placed in the outer recess.

3. The riveting tool according to claim 1 further comprising: a nut for regulating a stroke of the pressure mechanism screwed onto the extension of the pressure mandrel, the nut forming an adjustable stop with respect to the body.

4. The riveting tool according to claim 1 further comprising: a bias spring for urging the pressure mechanism to an idle position, and a nut screwed to the tube in the body spaced from the pressure mandrel, the bias spring positioned between the nut and the pressure mandrel.

5. The riveting tool according to claim 1 further comprising: a casing surrounding the interchangeable mandrel and placed in the front nozzle, to which is fixed the interchangeable extension having a front surface for riveting, and together with the nozzle is tightly inserted in the extension of the pressure mandrel, which is arranged for engagement with the shaped ends of the controlling levers of the tool.

6. The riveting tool according to claim 2 further comprising: a nut for regulating a stroke of the pressure mechanism screwed onto the extension of the pressure mandrel, the nut forming an adjustable stop with respect to the body.

7. The riveting tool according to claim 2 further comprising: a bias spring for urging the pressure mechanism to an idle position, and a nut screwed to the tube in the body spaced from the pressure mandrel, the bias spring positioned between the nut and the pressure mandrel.

8. The riveting tool according to claim 3 further comprising: a bias spring for urging the pressure mechanism to an idle position and a nut screwed to the tube in the body spaced from the pressure mandrel, the bias spring positioned between the nut and the pressure mandrel.

9. The riveting tool according to claim 2 further comprising: a casing surrounding the interchangeable mandrel and placed in the front nozzle, to which is fixed the interchangeable extension having a front surface for riveting, and together with the nozzle is tightly inserted in the extension of the pressure mandrel, which is arranged for engagement with the shaped ends of the controlling levers of the tool.

10. The riveting tool according to claim 3 further comprising: a casing surrounding the interchangeable mandrel and placed in the front nozzle, to which is fixed the interchangeable extension having a front surface for riveting, and together with the nozzle is tightly inserted in the extension of the pressure mandrel, which is arranged for engagement with the shaped ends of the controlling levers of the tool.

11. The riveting tool according to claim 4 further comprising: a casing surrounding the interchangeable mandrel and placed in the front nozzle, to which is fixed the interchangeable extension having a front surface for riveting, and together with the nozzle is tightly inserted in the extension of the pressure mandrel, which is arranged for engagement with the shaped ends of the controlling levers of the tool.

12. The riveting tool according to claim 5 further comprising: a casing surrounding the interchangeable mandrel and placed in the front nozzle, to which is fixed the interchangeable extension having a front surface for riveting, and together with the nozzle is tightly inserted in the extension of the pressure mandrel, which is arranged for engagement with the shaped ends of the controlling levers of the tool.

13. The riveting tool according to claim 6 further comprising: a casing surrounding the interchangeable mandrel and placed in the front nozzle, to which is fixed the interchangeable extension having a front surface for riveting, and together with the nozzle is tightly inserted in the extension of the pressure mandrel, which is arranged for engagement with the shaped ends of the controlling levers of the tool.

14. The riveting tool according to claim 7 further comprising: a casing surrounding the interchangeable mandrel and placed in the front nozzle, to which is fixed the interchangeable extension having a front surface for riveting, and together with the nozzle is tightly inserted in the extension of the pressure mandrel, which is arranged for engagement with the shaped ends of the controlling levers of the tool.

15. The riveting tool according to claim 8 further comprising: a casing surrounding the interchangeable mandrel and placed in the front nozzle, to which is fixed the interchangeable extension having a front surface for riveting, and together with the nozzle is tightly inserted in the extension of the pressure mandrel, which is arranged for engagement with the shaped ends of the controlling levers of the tool.

* * * * *